Feb. 8, 1966 — R. H. NEWELL — 3,233,647
CODING DEVICE FOR ELASTOMERIC ARTICLES
Filed June 26, 1963

INVENTOR.
RAYMOND H. NEWELL
BY
J. B. Holden
ATTORNEY 3,233,647
CODING DEVICE FOR ELASTOMERIC ARTICLES
Raymond H. Newell, Uniontown, Ohio, assignor to The Goodyear Tire & Rubber Company, Akron, Ohio, a corporation of Ohio
Filed June 26, 1963, Ser. No. 290,803
5 Claims. (Cl. 152—330)

This invention relates to elastomeric articles having as an integral part thereof an information storing component. More particularly, the invention relates to the placing of a continuous length of coded material within an article such as a tire, thus forming a permanent identification system that can be used advantageously with an automated production sequence.

The present invention comprises incorporating a sheet of an electromagnetically susceptible material within the structure of an elastomeric article. The sheet of electromagnetic material contains code indicia in the form of apertures of removed sheet material. The positioning or sequence of the apertures in the sheet material can be detected by suitable electromagnetic detection apparatus, thus providing a system of storing within, for example, a tire, information to aid in production and also identification for future use.

There are many ways in which tires are presently identified as to serial number, composition, and the facilities upon which the tire was built. The most common method is to produce numerals or letters in the form of cavities within the mold. This procedure results in raised numerals or letters upon the exterior surface of the cured tire. The identification thus produced is subject to wear or alteration which will destroy the identity of the tire.

In contrast to raised identification upon the tire exterior, indented identification can be created on the tire by affixing raised numerals or letters with the tire mold. The indented identification has limitations in that the letters can fill in and also serve as a source of crack propagation in an area of the tire that is already exceedingly thin. Most identification has heretofore been placed on the tire sidewalls where the overall structure is at a minimum thickness. Additional methods of creating a coding system within the tire structure have been proposed. One such method is set forth in U.S. Patent 2,920,674 in which coding indicia are magnetically stored within the continuous wire structure of a tire as long life magnetic field variations. The stored magnetic signals are then at any subsequent time played back from the wire structure within the tire, thus revealing its identification. The entire operation, as stated above, resembles the art of magnetic wire recording and replaying. The reliability of a magnetically stored information system suffers seriously in that a gradual demagnetization can occur in time, particularly when the tire is subjected to electrical machinery in which powerful magnetic fields are present. Then, too, the magnetic indicia can be purposely or accidentally removed, thus destroying forever the original code implanted within the tire. The reading out of such magnetic information is also affected by changes in magnetic fields when large masses of iron are nearby such as is usually the case in tire plants. A further serious defect is the relatively small amount of information which can be thus stored because of the distance between wire structure and magnetizing and read-out devices.

The outstanding advantages of the present invention over conventional and other proposed methods of tire identification lie in the fact that a permanent "passive" coding is produced which is an integral part of the tire structure.

An additional feature is that the signals within the tire can be read out at any convenient angular velocity or acceleration. Read out equipment having a constant rotational speed is not necessary. In fact, simple hand rotation is sufficient to extract the implanted signal from the tire.

By utilizing a plurality of rows of apertures, the coding system lends itself well to the binary numerical system. Two marks or apertures are all that are required to provide one of the best codes for mechanical handling of information. By providing two different rows of apertures, a simple coding system having a radix of two is established. This system satisfies the primary requisite of an economical physical system of handling information. Such a system must be minimal in cost, hold a large amount of information in as little space possible, and remain permanent throughout the life of the elastomeric article. The positioning of the apertures can be relatively close to one another, thus permitting a large amount of coded information to be permanently stored.

The term "electromagnetically susceptible" as used herein refers to magnetically susceptible and/or magnetizable characteristics of substances which substances include but are not limited to paramagnetic and dielectric substances.

While the preferred embodiment of the present invention is based upon the incorporation of paramagnetic sheet material within the structure of the elastomeric article, the invention is intended to apply equally well to sheet material that is dielectrically different with respect to the primary material of the elastomeric article.

The primary object of the present invention is to place within the structure of an elastomeric article a permanent code system capable of storing a maximum amount of information.

Another object of the present invention is to combine rubber sheet material with a material more susceptible to electromagnetic effects than the rubber itself, then integrally position the sheet material containing apertures in the form of code, within or on the structure of the elastomeric article.

A further object of the invention is to produce a code system within a tire that can be read independently of the speed of rotation during readout.

Other objects and advantages of this invention will be readily apparent from the following description when taken in conjunction with the following drawing in which.

Figure 1:
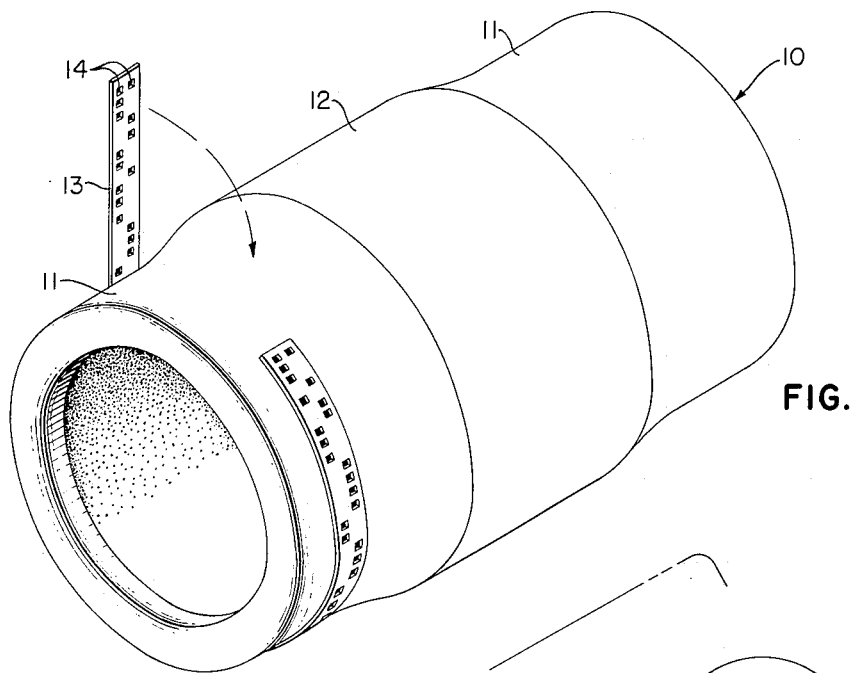
FIG. 1 is a perspective drawing of an uncured tire that is fabricated by the drum building technique.

Referring to FIG. 1, an uncured tire 10 is shown in perspective. The tire has been fabricated on a collapsible drum, thus imparting to it an overall cylindrical appearance. Cylindrical portions 11 will ultimately become the sidewalls of the completed tire and portion 12 will in a similar manner be the tread portion of the tire. Strip 13 is shown partially encompassing the uncured tire in sidewall area 11. Strip 13 is an elastomeric substance, preferably a rubber compound that contains an electromagnetically susceptible material such as paramagnetic or dielectric particles thoroughly interdispersed throughout the elastomeric sheet stock. A suitable material that can be milled with the rubber is barium ferrite

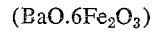

The milled mixture of rubber and electromagnetically susceptible material is calendered into sheet stock, then cut into strips of convenient width. The strips are then passed through an automatic aperture cutter that will place apertures 14 in their desired locations. The apertures are preferably rectangular in shape; however, other geometrical configurations would be considered within the scope of the invention. Coded strip 13 is then positioned on sidewall area 11 with a minimum amount of production time required.

Figure 2:
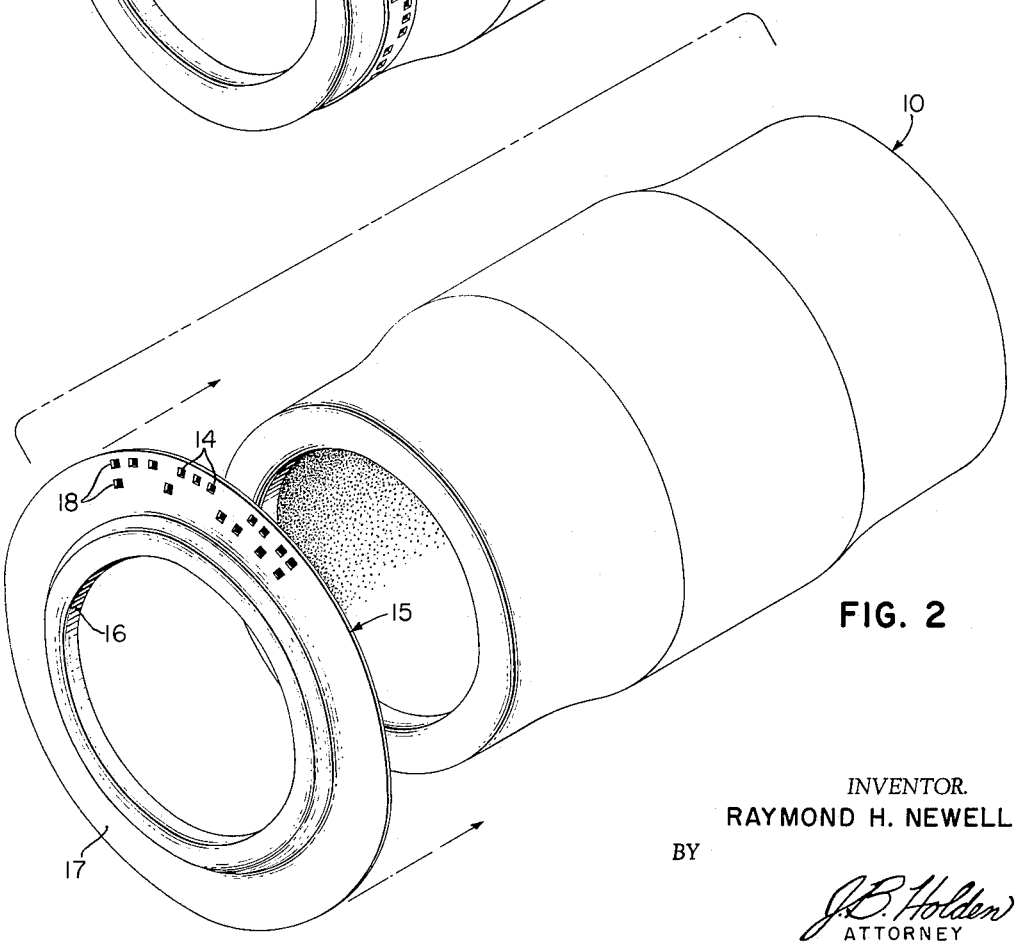
FIG. 2 is a view similar to FIG. 1 that additionally shows a bead ring axially aligned with the uncured tire.

FIG. 2 shows a view of an uncured tire similar to FIG. 1. The uncurled cylindrical tire 10 is reinforced by bead wire assemblies at each end thereof. A typical bead assembly is shown at 15. The reinforcement wire is positioned at 16. Wire 16 is covered by a flipper strip 17 comprised of rubber sheet stock. During an automated tire building operation, the bead wire 16 and its protective covering 17 are moved into position at the extremity of tire 10. The protective flipper strip 17 is then fitted or stitched to the tire sidewall. Strip 17 contains circumferentially aligned rows 18 of apertures 14 that are so placed to provide the desired information within the tire. The information thus stored within the tire can serve as a means of identification at any future time. In addition to providing an identification means, the coded arrangement of apertures can actuate machinery to perform certain operations such as buffing, grinding, and assorting according to size, etc.

The code included within the tire can be extracted at will by electrical apparatus employing an electromagnetic field or dielectric detection means. The equipment that can be adapted for this purpose, such as various gaussmeters, are well-known in the field of instrumentation and as such need not be commented upon in detail herein.

From the above description it can be determined that the present invention sets forth a new method of incorporating a code arrangement within or on a tire without distracting from the structural features thereof.

While certain representative embodiments and details have been shown for the purpose of illustrating the invention, it will be apparent to those skilled in this art that various changes and modifications may be made therein without departing from the spirit or scope of the invention.

I claim:

1. The combination comprising a tire having completely encapsulated within its structure a strip of electromagnetically susceptible material that contains apertures located in a predetermined physical code pattern, thus forming a passive positive identification system in which the information based upon the relative position of the apertures is capable of being detected by electromagnetic means.

2. The method comprising the steps of mixing particles of an electromagnetically susceptible material with an elastomeric compound, processing the resulting mixture into stock material, forming from said stock strips of material, positioning apertures in said strip in at least one longitudinally aligned row in a predetermined spaced apart pattern, wrapping the coded strip around a cylindrical portion of an uncured tire, curing the tire so that said coded strip forms an integral part thereof, thus resulting in a positive identification system capable of being read by electromagnetic means.

3. The method comprising the steps of mixing particles of an electromagnetically susceptible material with an elastomeric compound, processing the resulting mixture into stock material, positioning apertures in said stock material in a predetermined spaced apart pattern, positioning a portion of the stock material containing the apertures around the exterior surface of bead reinforcement wires so that the apertures are circumferentially aligned with respect to said wires and form an arculate path having a radius greater than said wires, moving the bead wires and its attached apertured material into abutting relationship with the end of an uncured tire, laying the unattached apertured material on the cylindrical portion of the uncured tire so that it will form an integral part of the sidewall of the cured tire.

4. The method as claimed in claim 3 wherein the electromagnetically susceptible material is barium ferrite.

5. The method as claimed in claim 4 wherein the apertures are rectangular in configuration.

References Cited by the Examiner

UNITED STATES PATENTS

| | | | |
|---|---|---|---|
| 1,448,286 | 3/1923 | Comstock | 152—353 X |
| 2,713,382 | 7/1955 | Bosomworth et al. | 152—362 |
| 2,920,674 | 1/1960 | Bull | 152—361 |
| 2,985,216 | 5/1961 | Williams et al. | 152—330 |
| 3,070,841 | 1/1963 | Schornstheimer. | |

OTHER REFERENCES

"Electrostatic Reading of Perforated Media," by Samuel Lubkin; I.R.E. Convention Record, part IV, 1954, pages 106–108.

ARTHUR L. LA POINT, *Primary Examiner.*